United States Patent
Algüera Gallego et al.

(10) Patent No.: US 7,758,059 B2
(45) Date of Patent: Jul. 20, 2010

(54) CONNECTOR BRACKET OF A TRAILER

(75) Inventors: José Manuel Algüera Gallego, Aschaffenburg (DE); Ernst Martin Richter, Frankfurt am Main (DE)

(73) Assignee: Jost-Werke GmbH, Neu-Isenburg (DE)

( * ) Notice: Subject to any disclaimer, the term of this patent is extended or adjusted under 35 U.S.C. 154(b) by 103 days.

(21) Appl. No.: 11/662,818

(22) PCT Filed: Sep. 8, 2005

(86) PCT No.: PCT/EP2005/009645
§ 371 (c)(1),
(2), (4) Date: Jul. 23, 2007

(87) PCT Pub. No.: WO2006/029753
PCT Pub. Date: Mar. 23, 2006

(65) Prior Publication Data
US 2008/0100032 A1 May 1, 2008

(30) Foreign Application Priority Data
Sep. 16, 2004 (DE) .................. 10 2004 044 991

(51) Int. Cl.
*B60D 1/62* (2006.01)
(52) U.S. Cl. .............. 280/420; 280/421; 280/422; 248/58; 248/49
(58) Field of Classification Search ............ 280/420, 280/421, 422; 248/58, 49
See application file for complete search history.

(56) References Cited

U.S. PATENT DOCUMENTS

| 4,092,034 | A | * | 5/1978 | Becker .................. 280/420 |
| 4,772,220 | A | * | 9/1988 | Hallier, Jr. .............. 439/528 |
| 5,082,217 | A | * | 1/1992 | Parker et al. ............. 248/75 |
| 5,184,960 | A | * | 2/1993 | Hopkins et al. ............ 439/35 |
| 5,516,136 | A | * | 5/1996 | Matthews et al. .......... 280/422 |
| 5,630,728 | A | | 5/1997 | Watters, Jr. |
| 5,660,408 | A | | 8/1997 | Johnson |
| 5,693,985 | A | * | 12/1997 | Gee et al. ................ 307/9.1 |
| 5,739,592 | A | * | 4/1998 | Rigsby et al. ............. 307/9.1 |
| 5,957,475 | A | * | 9/1999 | Pearen et al. ............. 280/409 |

(Continued)

FOREIGN PATENT DOCUMENTS

DE 41 35 795 5/1993

(Continued)

*Primary Examiner*—Lesley Morris
*Assistant Examiner*—Marlon A Arce
(74) *Attorney, Agent, or Firm*—Hudak, Shunk & Farine Co. LPA

(57) ABSTRACT

The invention relates to a coupling system for connecting at least one supply line between a towing vehicle and a trailer, the first end of said at least one supply line being attached to the towing vehicle in a fixed manner, and the second end thereof comprising a connector that can be connected to a supply line interface of the trailer. The aim of the invention is to provide a coupling system for the supply lines, by which means a complicated operation between the trailer and the driver's cab of the towing vehicle is avoided. To this end, a coupling system is provided, whereby the supply line interface can be displaced out of a traveling position into an operating position.

23 Claims, 7 Drawing Sheets

U.S. PATENT DOCUMENTS

| | | |
|---|---|---|
| 6,651,940 B2 * 11/2003 | Hill, Sr. | 248/80 |
| 6,902,180 B2 * 6/2005 | Baginski | 280/420 |
| 2004/0164516 A1 8/2004 | Baginski | |

FOREIGN PATENT DOCUMENTS

| | | |
|---|---|---|
| DE | 198 40 007 | 3/2000 |
| EP | 0 853 033 | 7/1998 |
| EP | 0 983 932 | 3/2000 |
| EP | 1 040 988 | 10/2000 |
| GB | 2 365 397 | 2/2002 |

* cited by examiner

CONNECTOR BRACKET OF A TRAILER

FIELD OF THE INVENTION

The invention relates to a coupling system to connect at least one supply line between a tractor vehicle and a semi-trailer, wherewith the at least one supply line has one end fixedly disposed at the tractor and has on its other end a plug or similar connector, which plug can be connected to a supply line interface associated with the semi-trailer.

BACKGROUND OF THE INVENTION

In practice, typically, the tractor vehicle is moved below the semi-trailer and the main pivot of the semi-trailer is caused to engage with the "fifth wheel coupling" of the tractor. After this mechanical hitching of the trailer to the tractor, typically the supply lines, e.g. for compressed air and electricity, and possibly pressurized hydraulic fluid, from the tractor are plugged into corresponding connectors on the semi-trailer, which receiving connectors are disposed in a supply line interface.

A storage module is disposed on the rear side of the tractor, whereby when the tractor is running dry with no semi-trailer the plugs can be accommodated in said storage module. Such a storage module is disclosed, e.g., in U.S. Pat. No. 5,630,728. The connections of the supply lines to the tractor occur through the storage module or near the storage module. A certain amount of reserve length of the supply lines is needed, approximately the same reserve length for each such supply line, to accommodate situations when the front end of the semi-trailer swings to one side or another when negotiating curves; wherewith typically the supply lines have a spiral configuration. Ordinarily the supply line interface is disposed at the longitudinal center axis of the vehicle.

The driver manually connects the supply lines to the supply line interface. For this, the driver must climb onto the tractor in the free space between the tractor cab and the semi-trailer, must remove the plugs from the storage module, and must plug the plugs into the supply line interface. The same procedure must be performed in reverse before the semi-trailer is separated from the tractor.

An essential disadvantage of this arrangement is that the driver is at appreciable risk of injury when he climbs onto the tractor. As an incentive for the industry to devise means of reducing this risk, the regulatory authorities, e.g. CRAM in France, provide for reduced fees for vehicles for which maneuvers by the driver on the vehicle are minimized. It is noted also that frequently the region between the tractor and trailer is dirty and wet, so that the driver's clothing also becomes soiled and wet during the coupling process, and he needs to change clothes.

Efforts have been made in the past to move the supply line interface to a location away from the free space between the tractor and semi-trailer. E.g., the semi-trailer has been provided with horizontal guide rails on its front side, with a supply line interface being slidably mounted on said rails. To connect the supply lines from the tractor to this supply line interface, said interface can be moved to the side, allowing lateral access to perform the connections. When the vehicle is negotiating curves, the supply line interface travels on the guide rails and takes a position with respect to the semi-trailer which position is shifted in the direction toward the interior of the curve. However, this solution leads to uncontrolled back and forth swinging of the supply line interface, particularly when the vehicle is negotiating curves, which mechanically stresses the supply lines themselves and may in fact damage them.

SUMMARY OF THE INVENTION

Accordingly, it is an object of the present invention to provide a coupling system for the supply lines which avoids extensive manipulations between the tractor cab and the semi-trailer, and which coupling system ensures a long service life of the system.

This object is achieved according to the invention by a coupling system in which the supply line interface is movable from a "driving position", in which position preferably said interface is held in place by catch means, into a "servicing position". In the driving position the supply line interface is always fixedly held at a generally central location near the longitudinal axis of the vehicle, directly opposite the (also fixedly held) point of attachment of the supply lines to the tractor. This allows approximately equal lateral swinging of the supply lines to one or the other side at their connection point to the semi-trailer when the vehicle is negotiating a curve. This driving position corresponds to the customary position of the supply line interface according to the state of the art, viz. in the region of the said longitudinal axis, but the invention eliminates the disadvantage of poor accessibility by the driver. According to the invention, when it comes time to connect or disconnect the supply lines the supply line interface is moved into a "servicing position", which may be on the front side of the semi-trailer within easy reach of a driver standing next to the side of the tractor.

Preferably, in the driving position the supply line interface is located in the region of the longitudinal axis of the vehicle, and in the servicing position said interface is located at one side of the semi-trailer, wherewith for safety reasons the servicing position should be located on the side of the semi-trailer which is opposite to the side on which traffic passes.

Advantageously, the supply line interface is mounted on the semi-trailer by the intermediary of, or so as to be acted on by forcing and guiding means, which forcing and guiding means may have any of numerous practicable forms.

According to a first preferred embodiment, the forcing and guiding means comprise a swing bearing which engages a swing arm which swing arm bears the supply line interface at its [distant] end. With this embodiment, the supply line interface is swung between the driving position and the servicing position, in a swinging excursion around a rigid swing axis, which axis is provided by the swing bearing.

The movement of the supply line interface may be accomplished, e.g., manually. In this connection it is advantageous if the swing arm has associated with it a pull handle which the driver can grab when the supply line interface is in the driving position, said handle being, e.g., at a location easily accessible to the driver on the side of the semi-trailer.

In order to achieve defined swinging of the supply line interface and to avoid damaging the pull handle during operation of the handle mechanism, the pull handle should be laterally movable in a pull handle guide which is fixedly mounted on the semi-trailer.

It has also been found to be advantageous if the pull handle is connected to the swing arm by articulation means. This enables the driver to be in a convenient position while the swinging movement is being effected, because the pull handle is "de-coupled" from the swinging movement of the swing arm.

In order to reduce the exertion by the driver and to ensure safe and reliable swinging-back of the supply line interface from the servicing position into the driving position, the swing arm and/or pulling handle may be engaged by a restoring spring which is fixedly but possibly swingably mounted to the semi-trailer. As the supply line interface is swung laterally outwardly into the servicing position, the spring comes under increasing tension; after the servicing is performed, connection or disconnection of the supply lines, the spring pulls the interface back into the driving position.

In addition to or in lieu of the restoring spring, a positioning cylinder may be provided for the swing arm. According to an advantageous arrangement, the first end of the positioning cylinder is swingably mounted on the semi-trailer, and the second end of said cylinder swingably or articulatedly engages the swing arm. The swing arm may be moved between the driving position and servicing position with the aid of the positioning cylinder', which may be actuated manually by the driver via valve means, or may be completely automated.

According to a preferred embodiment of the invention, a particularly compact solution is provided by forcing and guiding means comprising a swing drive which engages the swing arm. This obviates the possibly cumbersome presence of a positioning cylinder on the front wall of the semi-trailer facing the tractor; instead, the swing drive is provided in a compact coaxial disposition around the swing bearing. The fact that a swing drive so disposed has a low moment arm is not an important consideration, because the torque required is relatively low.

The types of forcing and guiding means described above enable the supply line interface and/or the swing arm and/or the swing bearing to be laterally displaceable into the servicing position. This lateral displaceability allows the supply line interface to be displaced farther to reach a suitable servicing position, thereby providing for particularly convenient conditions for connection and disconnection of the supply lines.

According to an alternative embodiment, a swing arm is not employed but rather the forcing and guiding means comprise at least one slide rail or guide rail on which the supply line interface is slidably disposed.

The length of the guide rail should be such that the rail extends from the region of the longitudinal center axis of the vehicle to a lateral region of the semi-trailer.

In all embodiments it is advantageous if the supply line interface and/or swing arm has at least one catch element which cooperates with at least one second catch element, which second catch element is associated with the semi-trailer. The first catch element may comprise, e.g., at least one pronged clip member formed on the supply line interface, which clip member at least partially surrounds a fixed second catch element when the final driving position is reached. The second catch element may comprise, e.g., a projecting pin element.

To ensure that the supply lines do not swing back and forth uncontrollably when the tractor is running dry without a semi-trailer, a storage module may be supplied which is disposed non-centrally on the tractor, namely at a position at which the driver can readily plug in or unplug the plugs without mechanical assistance while the driver is standing next to the tractor. Preferably the storage module is disposed on the rear wall of the cab of the tractor.

It may be more advantageous to leave the storage module in its customarily central location and provide another holding means non-centrally on the tractor, namely a holding bracket, disposed at a position readily accessible by a person standing at the side of the tractor. Thereby the option is provided of either plugging the aforementioned semi-trailer-side plug connectors into the centrally located storage module or into the laterally located holding bracket, depending on whether the next hitch operation will be to hitch the tractor to a semi-trailer with a movable supply line interface or to a semi-trailer with a conventional fixed supply line interface.

Advantageously, sensors are provided for detecting the driving position and/or the servicing position. Such sensors are particularly advantageous if the supply line interface is moved by automated means, wherewith the position and movements of said interface are displayed on a display device in the tractor cab.

BRIEF DESCRIPTION OF THE DRAWINGS

The invention will be described in more detail hereinbelow with reference to the accompanying 13 drawings.

DETAILED DESCRIPTION OF THE INVENTION

Figure 1:
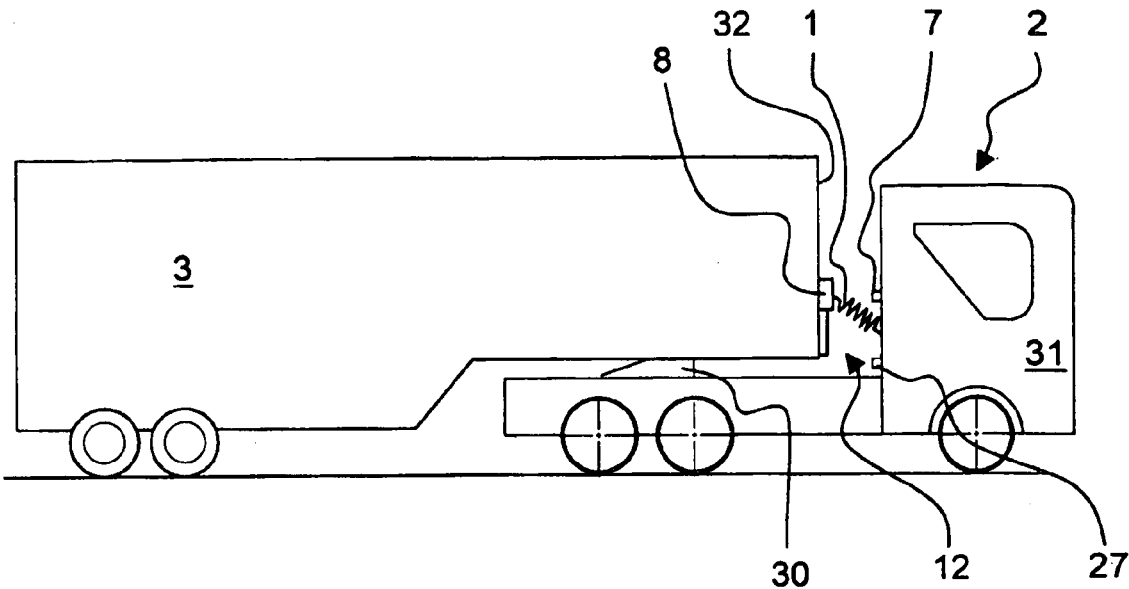
FIG. 1 is a lateral view of a tractor and semi-trailer combination.

FIG. 1 is a schematic lateral view of a tractor vehicle 2 with a semi-trailer 3 coupled to it, in travel-ready condition. The semi-trailer 3 is mechanically coupled to the tractor 2 via a conventional fifth wheel coupling 30. A plurality of utility supply lines 1 extend between the cab 31 of the tractor and the front wall 32 of the semi-trailer 3 only one of these, 1, is visible in the lateral view shown in FIG. 1. The supply lines 1 comprise compressed air lines and electrical lines.

The supply lines 1 emerge from the rear of the tractor cab 31 below a storage module 7, and are reversibly plugged into a supply line interface 8 of the semi-trailer 3. The supply line interface 8 is connected to forcing and guiding means 12 which will be described in more detail in connection with FIGS. 5 to 13.

Laterally and below the storage module 7, an auxiliary holding bracket 27 is mounted which is unused when the tractor and semi-trailer combination 2, 3 is in the travel-ready condition with the supply lines connected to the semi-trailer.

Figure 2:
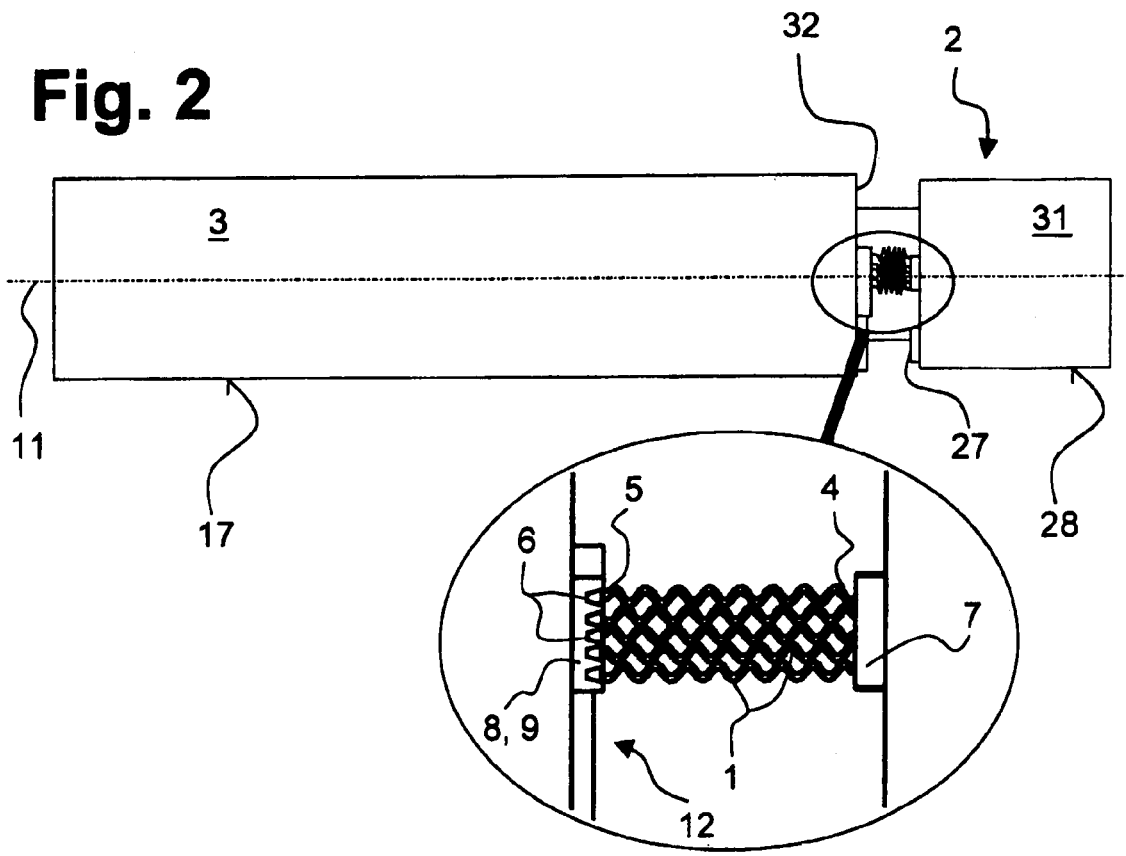
FIG. 2 is a plan view of a tractor and semi-trailer combination, and a detail view of the storage module and supply line interface.

The laterally displaced location of the mounting position of the holding bracket 27 with respect to the storage module 7 is readily seen in the plan view of FIG. 2. FIG. 2 also presents an enlarged detail view of the five supply lines 1 which exit at their first ends 4 from a position below the storage module 7 which module is fixedly mounted on the tractor cab 31, and which bear plugs 6 on their second ends 5. The plugs 6 are all plugged into the supply line interface 8. The interface 8 is disposed generally along the longitudinal center axis 11 of the vehicle, at a location which will be referred to as the "driving position" 9, used when the vehicle is ready to be driven, or is being driven. Under these circumstances, the supply line interface 8 is disposed directly opposite to the storage module 7.

Figure 3:
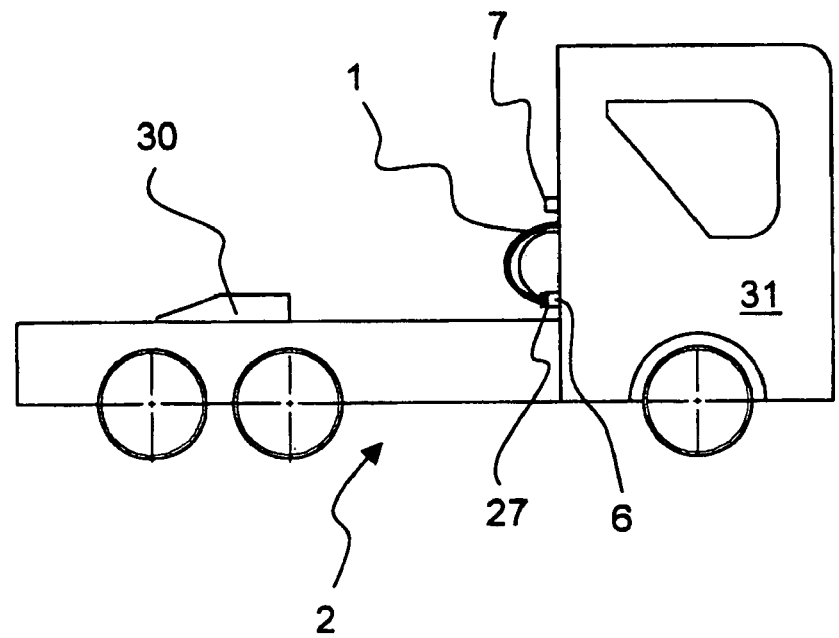
FIG. 3 is a lateral view of a tractor arranged for driving without an attached trailer, and having the plug connectors of the supply lines supported on a holding bracket.
Figure 4:
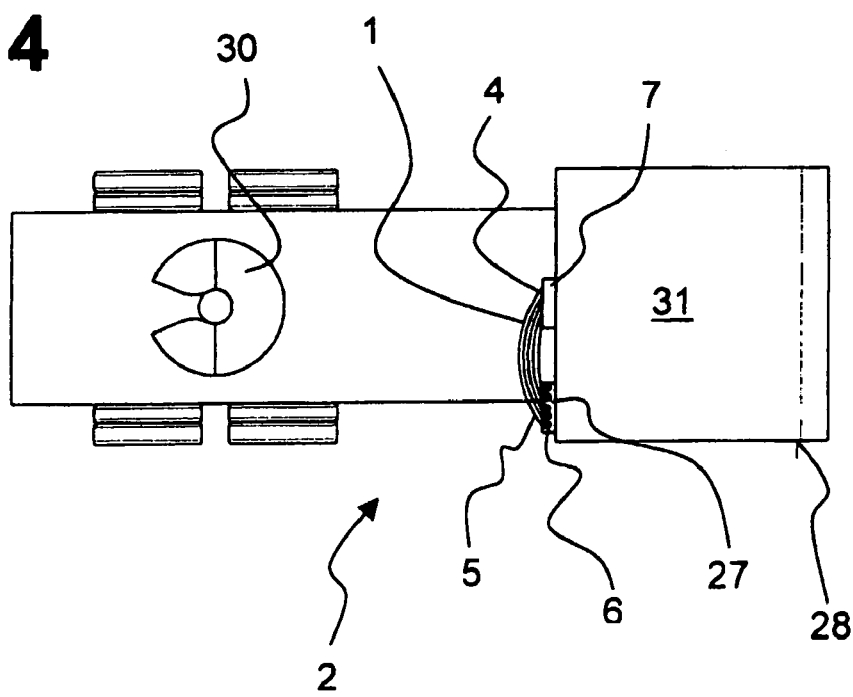
FIG. 4 is a plan view of a tractor arranged for driving without an attached trailer, and having the plug connectors of the supply lines supported on a holding bracket.

In FIGS. 3 and 4 the tractor 2 is shown without the semi-trailer 3. The supply lines 1 are connected to the holding bracket 27 via their plugs 6. When it comes time to connect with a semi-trailer 3 employing an inventive coupling system, these supply lines 1 can be easily reached by the driver standing on the side 28 of the tractor 2. In this situation, the storage module 7 is unused.

Figure 5:
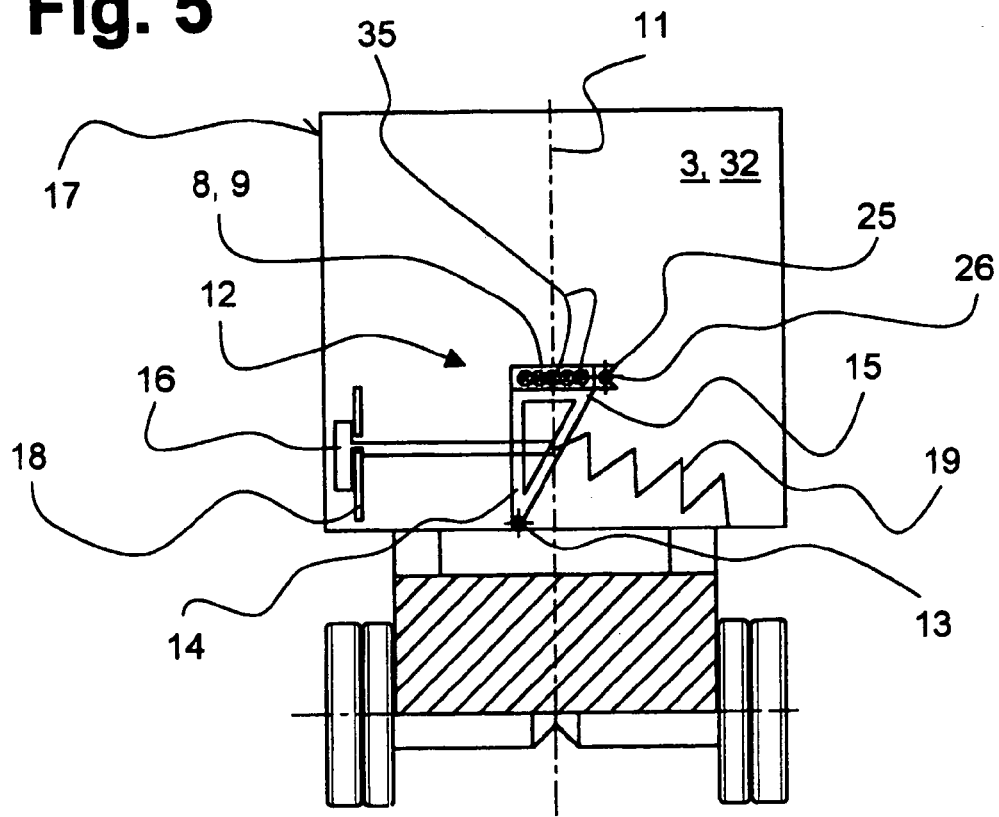
FIG. 5 is a front view of a semi-trailer having forcing and guiding means according to a first embodiment, and a restoring spring, in the driving position.

FIG. 5 is a front view of a semi-trailer 3 having forcing and guiding or manipulation means 12 for the supply line interface 8 according to a first embodiment. The supply line interface 8 is shown in the driving position 9.

The first embodiment illustrated comprises a swing arm 14 which is swingably mounted on the front wall 32 of the semi-trailer 3, via a swing bearing 13. The swing bearing 13 is disposed close to the longitudinal center axis 11 of the vehicle. In the illustrated driving position 9 of the supply line interface 8, the swing arm 14 is disposed generally vertically upright. For reinforcement, the swing arm 14 comprises three interconnected bar elements which form a right triangle. In the configuration according to FIG. 5, the supply line interface 8 is disposed at the end of the swing arm 14, extending toward the side of the angular leg 15 of the right-triangle structure. The supply line interface 8 bears five plug sockets 35, disposed symmetrically with respect to the longitudinal center axis 11 of the vehicle.

A middle region of the swing arm 14 is engaged by a restoring spring 19 and also by a pulling handle 16.

When the supply line interface 8 is in its driving position 9, the pulling handle 16 is oriented horizontally, with the end of handle 16 which is oppositely disposed to the swing arm 14 being disposed approximately at the side 17 of the semi-trailer 3. The pulling handle 16 which has its end disposed in the region of the side 17 is held, releasably, against the pulling handle guide 18 which is fixed to the front wall 32.

The restoring spring 19 is fixed, possibly swingably, to the semi-trailer 3 at its end oppositely disposed to the swing arm 14, and when [the swing arm is] in the "driving position" 9 said spring is in a nearly relaxed condition. When one pulls on the pulling handle 16, the swing arm 14 and the supply line interface 8 which it bears are swung sideward toward the side 17, into the "servicing position" 10, see FIG. 6. During the swinging excursion, the restoring force in the restoring spring 19 increases steadily, wherewith after the supply lines 1 are plugged in, see FIGS. 1 and 2, the spring facilitates a defined return of the swing arm 14 from the servicing position 10 into the driving position 9. Generally any type of spring element is suitable for use as the restoring spring 19, for the embodiment according to FIG. 5 a helical spring is suggested.

In the driving position 9, the swing arm 14 bearing the supply line interface 8 can be held in place on the semi-trailer 3 by catch means. A V-shaped catch element 25 is provided on the supply line interface 8, for this purpose; element 25 cooperates with a pin-shaped second catch element 26 mounted on the front wall 32. The catch elements 25, 26 are practicable means of preventing uncontrolled swinging of the swing arm 14 in the driving position 9, particularly when the vehicle is negotiating curves in the road, which might cause various types of damage as well as premature wear of the swing bearing 13.

Figure 6:
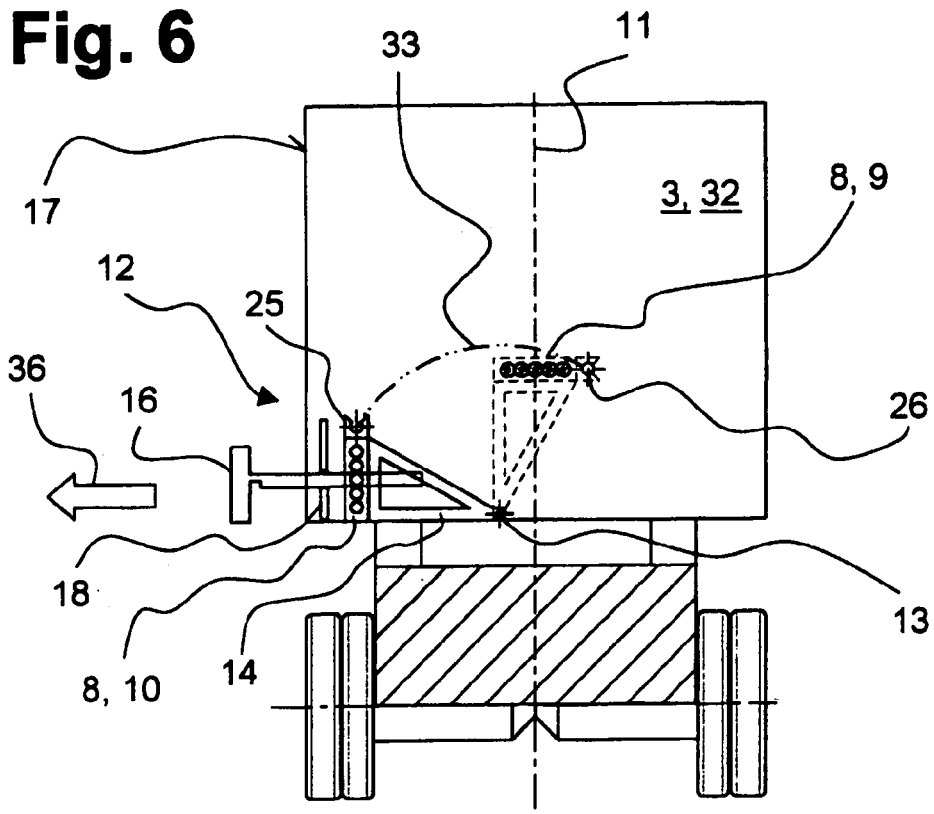
FIG. 6 is a rear view of a semi-trailer having forcing and guiding means according to a first embodiment, in the servicing position.

FIG. 6 shows the swing arm 14 in the "servicing position" 10, in which the arm is swung laterally by 90° C. To bring about the servicing position 10, the pulling handle 16 is pulled in the pulling direction 36, causing the supply line interface 8 to be moved toward the side 17 of the semi-trailer 3, along the swing path 33. The supply line interface 8 is now close to the pulling handle guide 18, and is readily accessible by the driver standing next to the semi-trailer 3, for plugging in the plugs 6 in FIG. 2. In the servicing position 10, the lower border of the swing arm 14 is disposed at the lower end of the front wall 32 of the semi-trailer 3.

Figure 7:
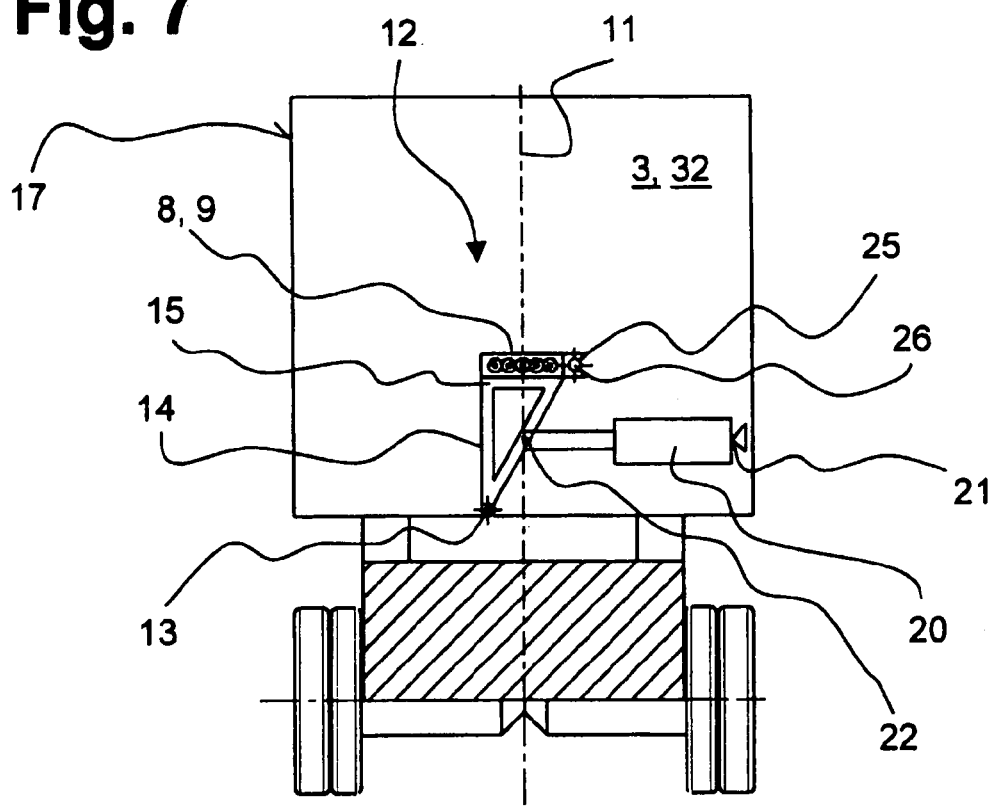
FIG. 7 is a front view of a semi-trailer having forcing and guiding means according to a first embodiment, and a positioning cylinder, in the driving position.
Figure 8:
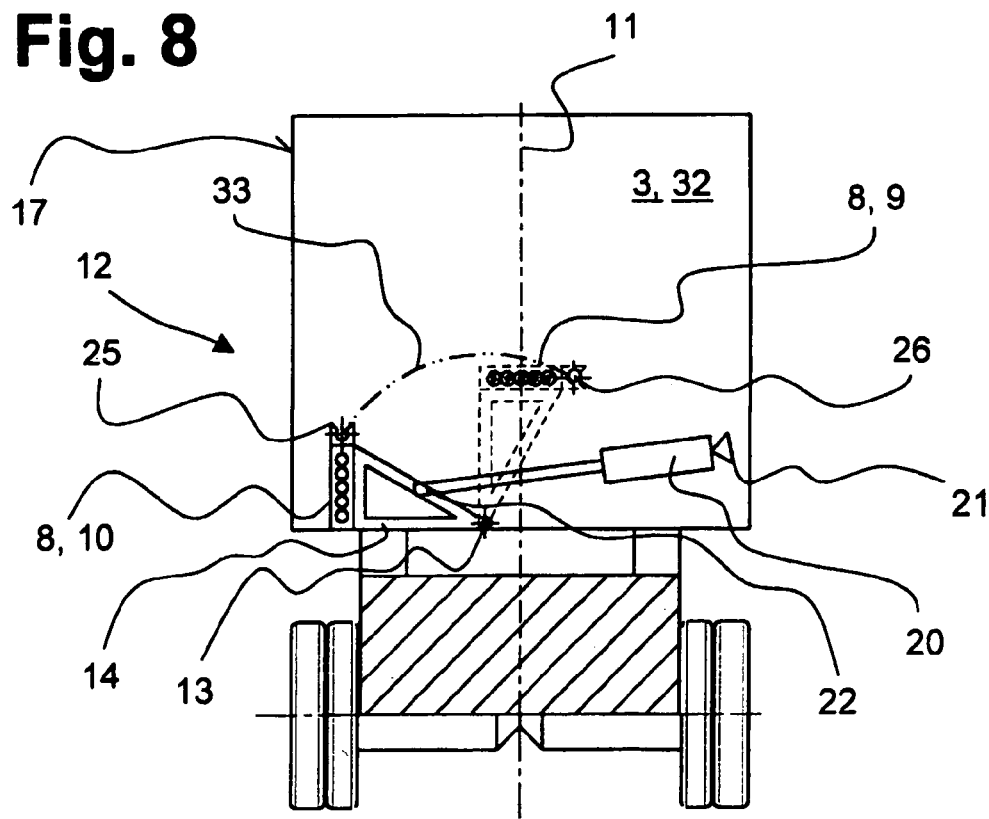
FIG. 8 is a rear view of a semi-trailer having forcing and guiding means according to a first embodiment, and a positioning cylinder, in the servicing position.

FIGS. 7 and 8 show, in analogous views to FIGS. 5 and 6, an alternative embodiment of the invention, with an identically configured forcing and guiding means 12, but instead of a restoring spring 19 a positioning cylinder 20 is provided. The first end 21 of the positioning cylinder 20 engages the semi-trailer 3, and the second end 22 of cylinder 20 engages the swing arm 14.

In FIG. 7, the swing arm 14 bearing the supply line interface 8 is in the driving position 9 wherein the first catch element 25 of the supply line interface 8 partially surrounds the second catch element 26 mounted on the front wall 32. The positioning cylinder 20 is fully retracted in the driving position 9, and is oriented perpendicularly to the axial extent of the swing arm 14 and parallel to the lower side of the front wall 32 of the semi-trailer 3.

To move the supply line interface 8 into the servicing position 10 in FIG. 8 an actuating fluid is applied to the positioning cylinder 20, and the cylinder 20 is moved to its extended position. This causes the supply line interface 8 with the swing arm 14 to be swung around the swing bearing 13. The actuating fluid may be any suitable liquid, vapor, or gas. In reaching the servicing position 10, there is some swinging of the positioning cylinder 20 around i.e. at its first and second ends 21, 22. In the process, the supply line interface 8 is moved through the swing path 33 of 90° C., and in this embodiment as well the interface 8 comes to a position near the side 17 of the semi-trailer 3.

Figure 9:
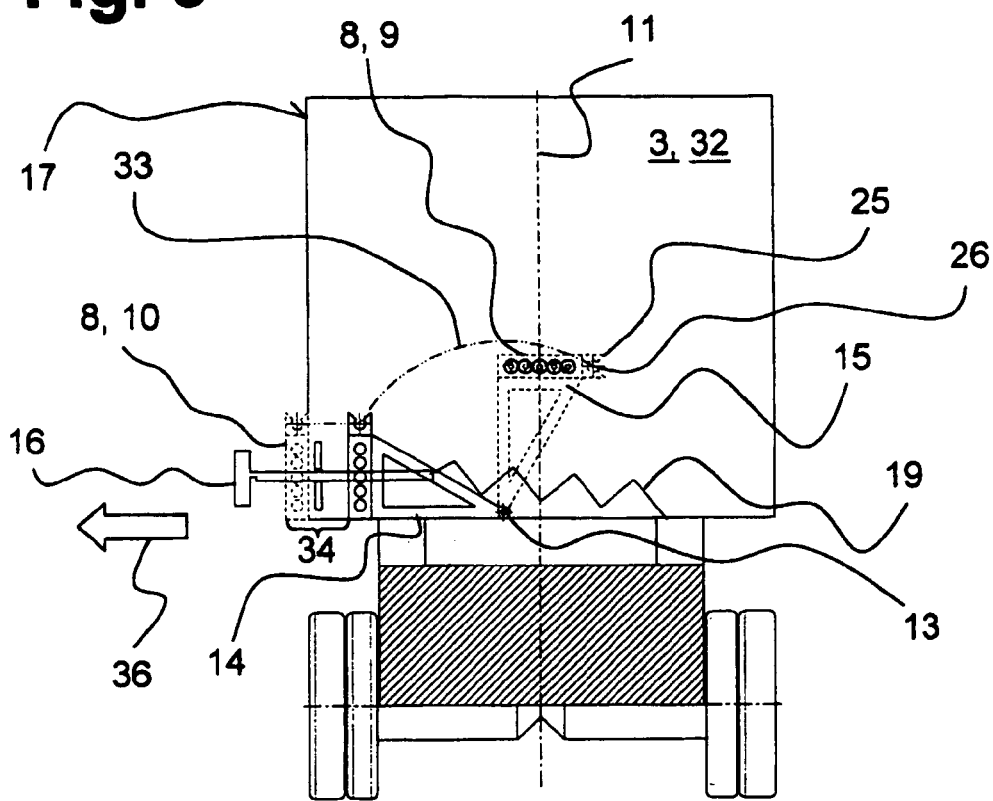
FIG. 9 is a view according to claim 5, with a laterally displaceable supply line interface laterally displaceable with respect to the swing arm.

FIG. 9 shows an embodiment according to FIGS. 5 and 6 with a restoring spring 19 and a pulling handle 16 which engages the swing arm 14. With this embodiment, not only is pure swinging movement in the swing path 33 possible, but also the pulling handle 16 can be pulled an additional distance in the pulling direction 36, thereby moving the supply line interface 8 laterally out past the side 17. Thus the supply line interface 8 is caused to undergo an excursion through the swing path 33 as well as a lateral excursion 34, into a position which particularly facilitates the plugging-in of the plugs 6, see FIG. 2, by the driver standing near the semi-trailer 3.

Figure 10:
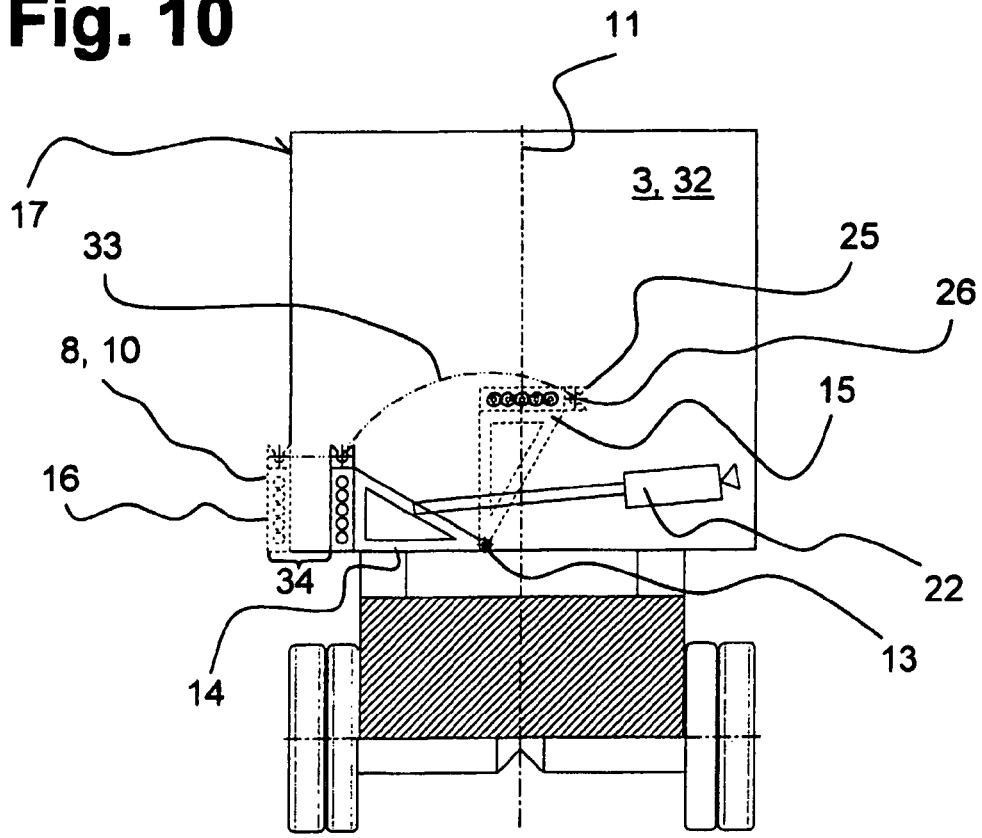
FIG. 10 is a view according to FIG. 8, with a laterally displaceable supply line interface laterally displaceable with respect to the swing arm.

This additional lateral excursion 34 can also be achieved with a positioning cylinder 20, as illustrated in FIG. 10. With this embodiment, the pulling handle 16 can be dispensed with, and the lateral excursion 34 can be brought about solely by further extension of the positioning cylinder 20.

Figure 11:
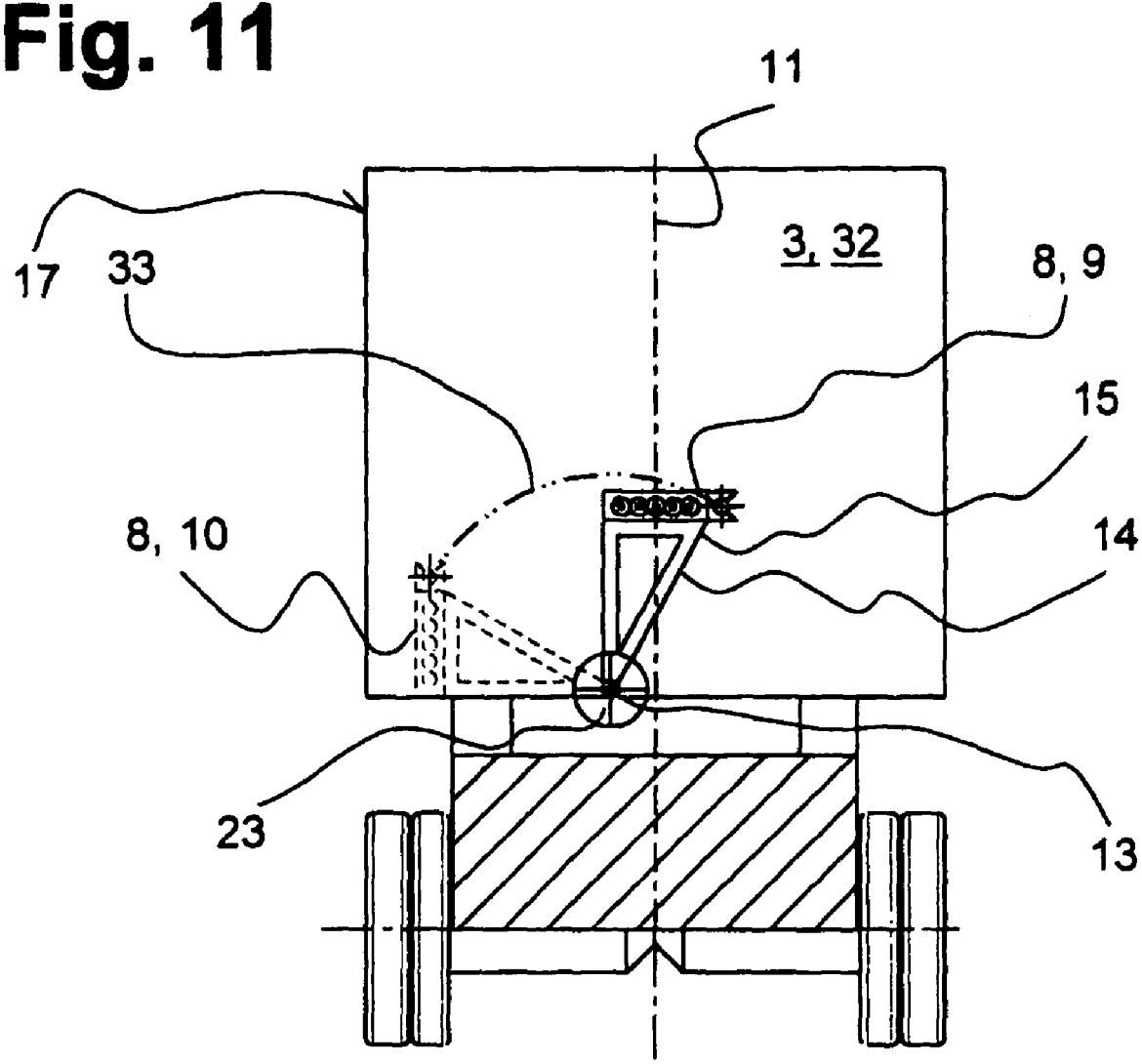
FIG. 11 is a rear view of a semi-trailer having forcing and guiding means according to a first embodiment, and a swing drive for accomplishing the described swinging movement.

FIG. 11 shows a swing arm 14 in the driving position 9, with a swing drive means 23 disposed in the area of the swing bearing 13, which drive 23 is capable of driving the swing arm. The swing drive 23 coaxially surrounds to the swing bearing 13. When the swing drive 23 is actuated, the supply line interface 8 is swung into the servicing position 10.

Figure 12:
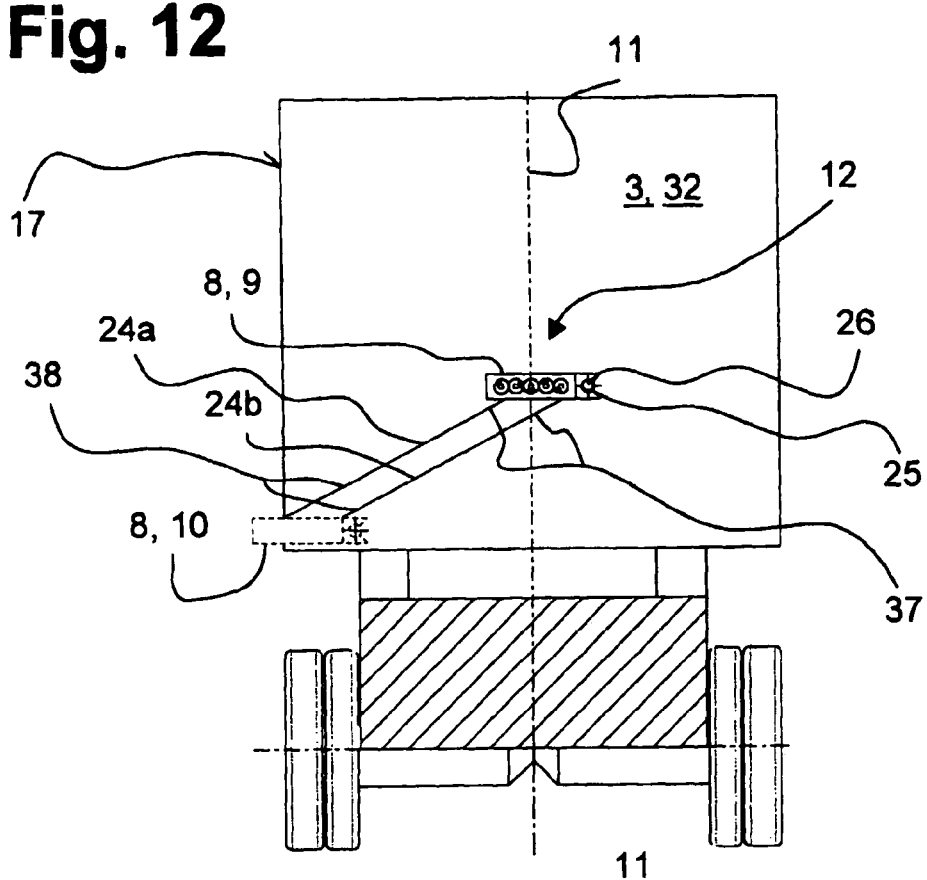
FIG. 12 is a rear view of a semi-trailer having forcing and guiding means according to a second embodiment, in the driving position.
Figure 13:
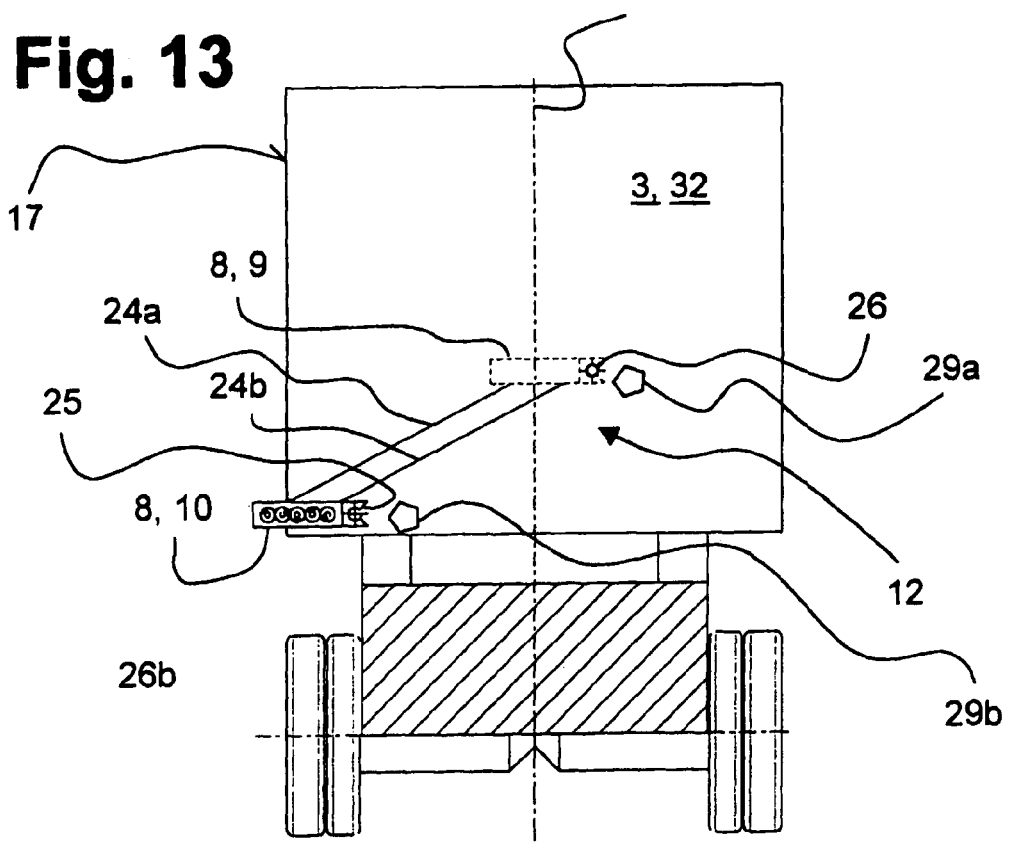
FIG. 13 is a rear view of a semi-trailer having forcing and guiding means according to a second embodiment, in the servicing position.

FIGS. 12 and 13 illustrate an alternative embodiment which does not employ a swing arm 14. Instead, the forcing and guiding means 12 comprise two parallel slide rails or guide rails 24a; 24b which have a first end 37, 37 on opposite sides of the longitudinal center axis of 11 of the vehicle, and have a second end 38, 38 in the region of the side 17 of the semi-trailer 3. The rails 24a, 24b extend in a downwardly inclined path from the center axis 11 to the side 17. The supply line interface 8 is slidably guided on said rails 24a, 24b and can be moved between a central driving position 9 and a lateral servicing position 10.

FIG. 12 shows the supply line interface 8 in the driving position 9. With the aid of the first catch element 25 disposed on the supply line interface 8, the interface 8 is held against the second catch element 26. To move the supply line interface 8, one may employ, e.g., a pulling handle 16 and restoring spring 19 combination, or a positioning cylinder 20, analogously to the embodiments illustrated in FIGS. 5 to 11, these motive components are not shown in FIGS. 12 and 13.

FIG. 13 shows the supply line interface 8 in the servicing position 10, in which a part of the interface 8 extends beyond the side 17 of the semi-trailer 3.

FIG. 13 also shows sensors 29a and 29b. Sensor 29a detects the driving position 9, and sensor 29b detects the servicing position 10.

LIST OF REFERENCE NUMERALS

1 supply lines
2 tractor vehicle
3 semi-trailer
4 first end of supply line(s)
5 second end of supply line(s)
6 plug connector(s) or the like
7 storage module
8 supply line interface
9 "driving position" of the supply line interface
10 "servicing position" of the supply line interface
11 longitudinal center axis of the vehicle
12 forcing and guiding means for the supply line interface
13 swing bearing
14 swing arm
15 end of swing arm
16 pulling handle
17 side of the semi-trailer
18 guide for the pulling handle
19 restoring spring
20 positioning cylinder
21 first end of the positioning cylinder
22 second end of the positioning cylinder
23 swing drive means
24a,24b slide rails (guide rails)
25 first catch element
26 second catch element
27 holding bracket
28 side of the tractor
29a,29b sensors
30 "fifth wheel coupling"
31 cab of the tractor
32 front wall of the semi-trailer
33 swing path
34 lateral movement path
35 sockets for plug connectors or the like
36 direction of pull of the pulling handle
37 first end of the slide rails
38 second end of the slide rails

The invention claimed is:

1. A coupling system to connect at least one supply line between a tractor vehicle and a semi-trailer, wherewith the at least one supply line has one end fixedly disposed at the tractor and has on its other end a plug or similar connector, said coupling system comprising: a supply line interface disposed on the semi-trailer for connecting to the at least one plug when the tractor and semi-trailer are hitched together; wherein at least one storage module is disposed on the tractor which module can releasably accommodate the at least one plug; and wherein the supply line interface can be moved from a "driving position" to a "servicing position" wherein the supply line interface when in the driving position is always fixedly held in a central region of a longitudinal axis of the vehicle, and when in the servicing position is disposed at one side of the semi-trailer.

2. The coupling system according to claim 1, wherein the supply line interface is engaged by forcing and guiding means.

3. The coupling system according to claim 2, wherein the forcing and guiding means comprise a swing bearing and an adjoining swing arm, wherewith the supply line interface is disposed at the end of said swing arm.

4. The coupling system according to claim 3, wherein a pulling handle is disposed at the swing arm.

5. The coupling system according to claim 4, wherein in the driving position the pulling handle can be grabbed from one side of the semi-trailer.

6. The coupling system according to claim 4, wherein the pulling handle is laterally slidable in a pulling handle guide which is disposed at a fixed location on the semi-trailer.

7. The coupling system according to claim 4, wherein the pulling handle is swingably connected to the swing arm.

8. The coupling system according to claim 3, wherein the swing arm or the pulling handle or both are engaged by a restoring spring which spring is mounted, optionally swingably, on the semi-trailer at a fixed place on said semi-trailer.

9. The coupling system according to claim 3, wherein a positioning cylinder engages the swing arm.

10. The coupling system according to claim 9, wherein one end of the positioning cylinder is swingably mounted to the semi-trailer, and the other end of said cylinder is swingably joined to the swing arm.

11. The coupling system according to claim 3, wherein a swing drive engages the swing arm.

12. The coupling system according to claim 11, wherein the swing drive is disposed coaxially around the swing bearing.

13. The coupling system according to claim 1, wherein the supply line interface or the swing arm or the swing bearing or a combination thereof are laterally displaceable when in the servicing position.

14. The coupling system according to claim 2, wherein the forcing and guiding means comprises at least one slide rail on which rail(s) the supply line interface is slidably disposed.

15. The coupling system according to claim 14, wherein the slide rail(s) extend(s) from the region of the longitudinal axis of the vehicle to a side of the semi-trailer.

16. The coupling system according to claim 1, wherein the supply line interface or the swing arm or both has at least one first catch element which cooperates with at least one second catch element which catch element(s) are associated with the semi-trailer.

17. The coupling system according to claim 1, wherein the storage module is disposed at a non-central location on the tractor.

18. The coupling system according to claim 1, wherein a holding bracket is also provided which is disposed at a non-central location on the tractor.

19. The coupling system according to claim 17, wherein the storage module or holding bracket is accessible from one side of the tractor.

20. The coupling system according to claim 1, wherein sensors are provided which can detect the driving position or the servicing position or both.

21. A coupling system to connect at least one supply line between a tractor vehicle and a semi-trailer, wherewith the at least one supply line has one end fixedly disposed at the tractor and has on its other end a plug or similar connector, said coupling system comprising:
- a supply line interface disposed on the semi-trailer for connecting to the at least one plug when the tractor and semi-trailer are hitched together;
- wherein at least one storage module is disposed on the tractor which module can releasably accommodate the at least one plug; and
- wherein the supply line interface can be moved from a "driving position" to a "servicing position", wherein the supply line interface when in the driving position is fixedly held by a catch element in a central region of the longitudinal axis of the vehicle, and when in the servicing position is disposed at one side of the semi-trailer.

22. A coupling system to connect at least one supply line between a tractor vehicle and a semi-trailer, wherewith the at least one supply line has one end fixedly disposed at the tractor and has on its other end a plug or similar connector, said coupling system comprising:
- a supply line interface disposed on the semi-trailer for connecting to the at least one plug when the tractor and semi-trailer are hitched together;
- wherein the supply line interface is engaged by forcing the guiding means comprising a swing bearing and an adjoining swing arm, wherewith the supply line interface is disposed at the end of said swing arm;
- wherein at least one storage module is disposed on the tractor which module can releasably accommodate the at least one plug;
- and wherein the supply line interface can be moved from a "driving position" to a "servicing position", wherein the supply line interface when in the driving position is fixedly held by a catch element in a central region of the longitudinal axis of the vehicle, and when in the servicing position is disposed at one side of the semi-trailer; and
- wherein a pulling handle is disposed at the swing arm or a positioning cylinder engages the swing arm.

23. A coupling system to connect at least one supply line between a tractor vehicle and a semi-trailer, wherewith the at least one supply line has one end fixedly disposed at the tractor and has on its other end a plug or similar connector, said coupling system comprising:
- a supply line interface disposed on the semi-trailer for connecting to the at least one plug when the tractor and semi-trailer are hitched together;
- wherein the supply line interface is engaged by forcing the guiding means comprising at least one slide rail on which the supply line interface is slidably disposed;
- wherein at least one storage module is disposed on the tractor which module can releasably accommodate the at least one plug;
- wherein the supply line interface can be moved from a "driving position" to a "servicing position", wherein the supply line interface when in the driving position is fixedly held in a central region of the longitudinal axis of the vehicle, and when in the servicing position is disposed at one side of the semi-trailer; and
- wherein a pulling handle or a positioning cylinder engages the supply line interface.

\* \* \* \* \*